US006536463B1

(12) United States Patent
Beals et al.

(10) Patent No.: US 6,536,463 B1
(45) Date of Patent: Mar. 25, 2003

(54) METHOD AND SYSTEM FOR INSTALLING CABLE IN PRESSURIZED PIPELINES

(75) Inventors: Scott A. Beals, Los Angeles, CA (US); Robert E. Evans, Pasadena, CA (US)

(73) Assignee: Sempra Fiber Links, San Diego, CA (US)

( * ) Notice: Subject to any disclaimer, the term of this patent is extended or adjusted under 35 U.S.C. 154(b) by 0 days.

(21) Appl. No.: 09/685,236

(22) Filed: Oct. 10, 2000

(51) Int. Cl.[7] ............................. H02G 1/08; H02G 9/06
(52) U.S. Cl. ................. 137/318; 137/15.12; 137/15.13; 137/15.14; 137/317; 254/134.3 R; 254/134.4; 405/154.1; 405/156; 405/174; 405/183.5; 405/184
(58) Field of Search ............................... 137/318, 317, 137/15.12, 15.13, 15.14; 73/40.5 A, 40.5 R; 138/97, 155; 254/134.3 R, 134.3 FT, 134.4; 405/154.1, 155, 156, 157, 159, 168.3, 174, 177, 183.5, 184

(56) References Cited

U.S. PATENT DOCUMENTS

| | | | |
|---|---|---|---|
| 920,455 A | 5/1909 | Greenan | |
| 1,658,887 A | 2/1928 | Dotzauer | |
| 2,930,584 A | 3/1960 | Hensley et al. | |
| 3,034,766 A | 5/1962 | Hamrick | |
| 4,261,204 A | 4/1981 | Donaldson | |
| 4,427,112 A | 1/1984 | Di Giovanni et al. | |
| 4,518,817 A | 5/1985 | Kirby et al. | |
| 4,649,948 A | * 3/1987 | Hudson | 137/318 |
| 4,756,510 A | 7/1988 | Klamm et al. | |
| 4,856,937 A | 8/1989 | Grocott et al. | |
| 4,917,539 A | 4/1990 | De la Salle | |
| 5,042,528 A | 8/1991 | England et al. | |
| 5,090,665 A | 2/1992 | Walters et al. | |
| 5,121,644 A | 6/1992 | Grey et al. | |
| 5,156,376 A | 10/1992 | Spicer | |
| 5,205,542 A | 4/1993 | Keeble | |
| 5,227,080 A | 7/1993 | Berry | |
| 5,482,073 A | 1/1996 | Winnie et al. | |
| 5,612,499 A | * 3/1997 | Andrew et al. | 137/318 |
| 5,660,202 A | * 8/1997 | Rush, Jr. et al. | 137/318 |
| 5,778,919 A | * 7/1998 | Petrone | 137/318 |
| 5,971,035 A | 10/1999 | Griffioen | |
| 6,056,004 A | 5/2000 | Agnew | |
| 6,286,542 B1 | * 9/2001 | Morain et al. | 137/318 |

FOREIGN PATENT DOCUMENTS

| | | |
|---|---|---|
| DE | 23 55 383 A1 | 5/1975 |
| DE | 3140928 A1 | 5/1983 |
| EP | 0 795 942 B1 | 8/2000 |

OTHER PUBLICATIONS

RM Consulting, Final Report "Fiber Optic Cable In Live Natural Gas Lines", Phase 11A, Nov. 29, 1999, 3 pages.
Gregor, Paul E et al., Alcatel—*Optical Fiber Cable Links With Gas Pipelines As An Alternative Telecommunications Route Technology*, International Wire Cable Symposium Proceedings 1999, 7 pages.

(List continued on next page.)

Primary Examiner—George L. Walton
(74) Attorney, Agent, or Firm—Perkins Coie LLP

(57) ABSTRACT

A method of introducing a fiber optic conduit into a pressurized gas pipeline includes the step of introducing a translating member into the pressurized gas pipeline via an entry port in a first drilling nipple attached to the pressurized gas pipeline. Tools are deployed within a first pressure lock housing attached to the first drilling nipple by using a first manipulator located in the first air lock housing. The duct rod is advanced within pressurized gas pipeline by a driving mechanism, until a second drilling nipple is reached. The translating member is attached to a fiber optic conduit. The duct rod and fiber optic conduit are then pulled back or pulled forward through the pressurized gas pipeline by the driving mechanism.

27 Claims, 12 Drawing Sheets

OTHER PUBLICATIONS van Heugten, Wim H.H., "*Gastec Glass–in–gas method leads to considerable reduction in laying costs*", Gastec NV, 4 pages.

Reuters, Telecom stocks are exciting high growth investment opportunities. Mar. 1, 2000, 1 page.

Scott, Latayne C., Nortel Targeting Utilities' Telecom Business, Apr. 21, 2000, 3 pages.

Gastec, "*Glass fiber Optic Cables in Gas Pipes*", Gastec 2000, 30 pages.

\* cited by examiner

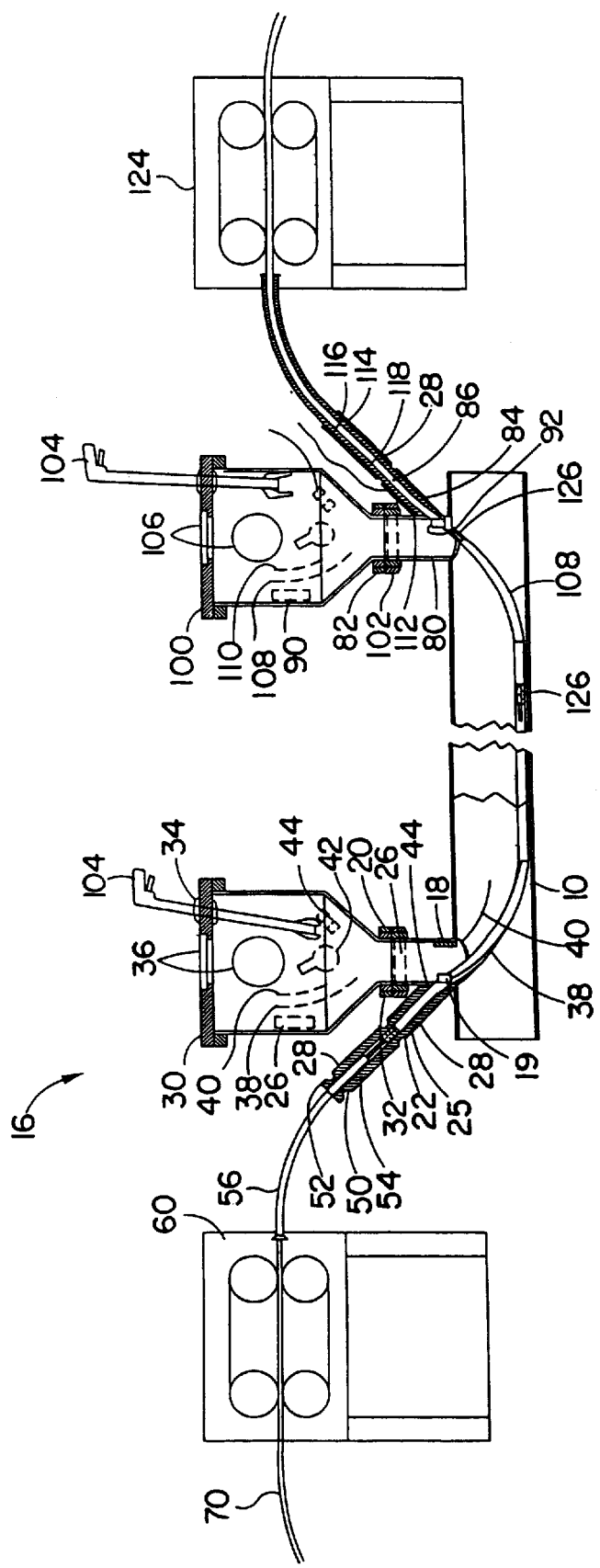

FIG. 4A
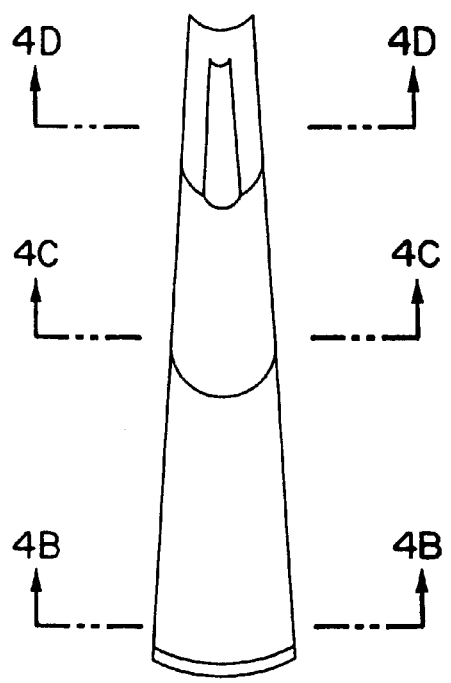
FIG. 4D
FIG. 4C
FIG. 4B

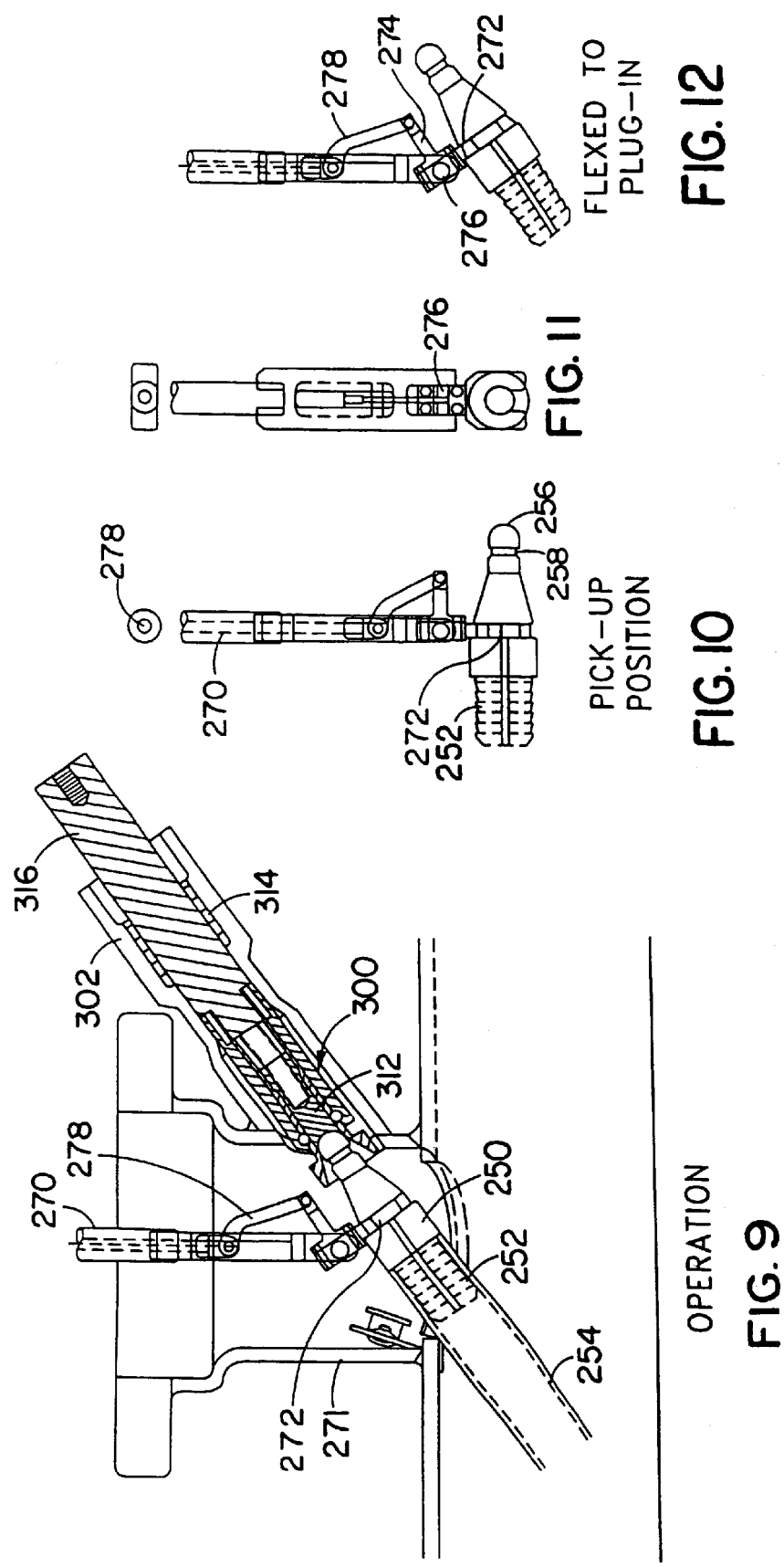

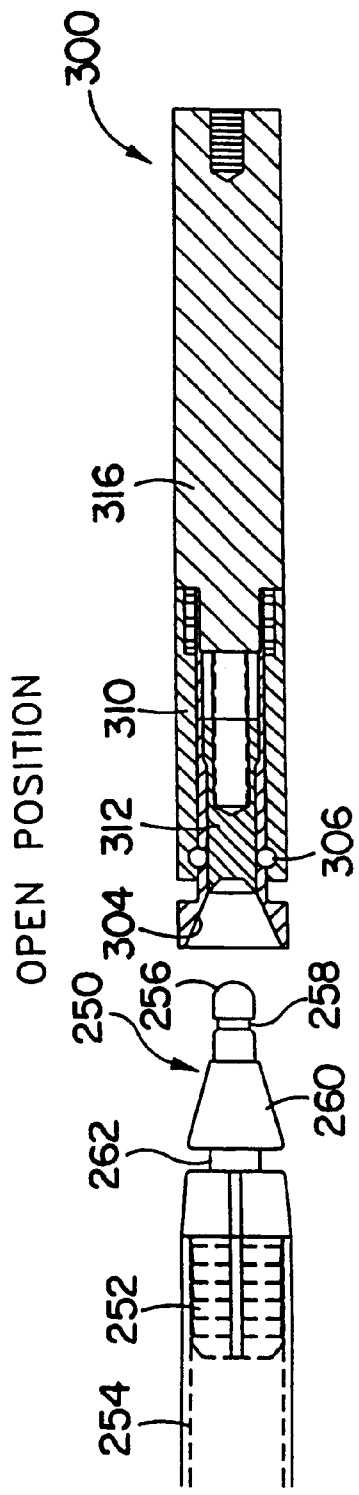
FIG. 13 OPEN POSITION
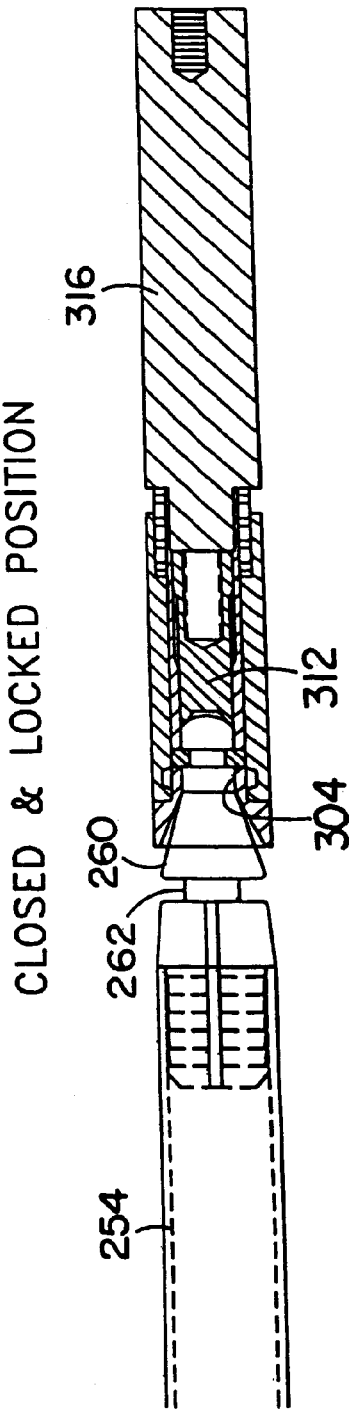
FIG. 14 CLOSED & LOCKED POSITION

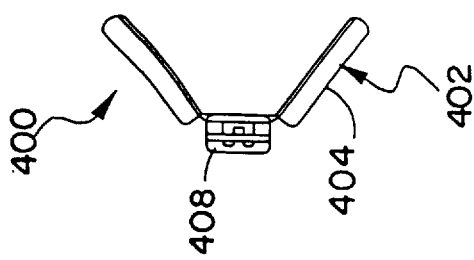
FIG. 16
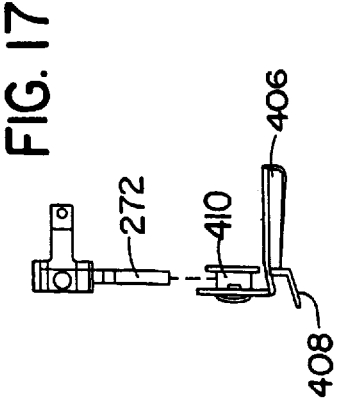
FIG. 17
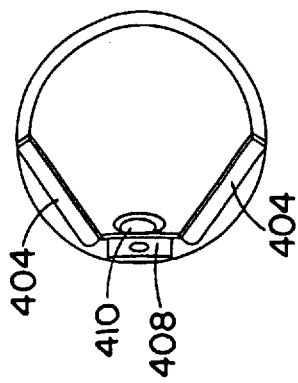
FIG. 18
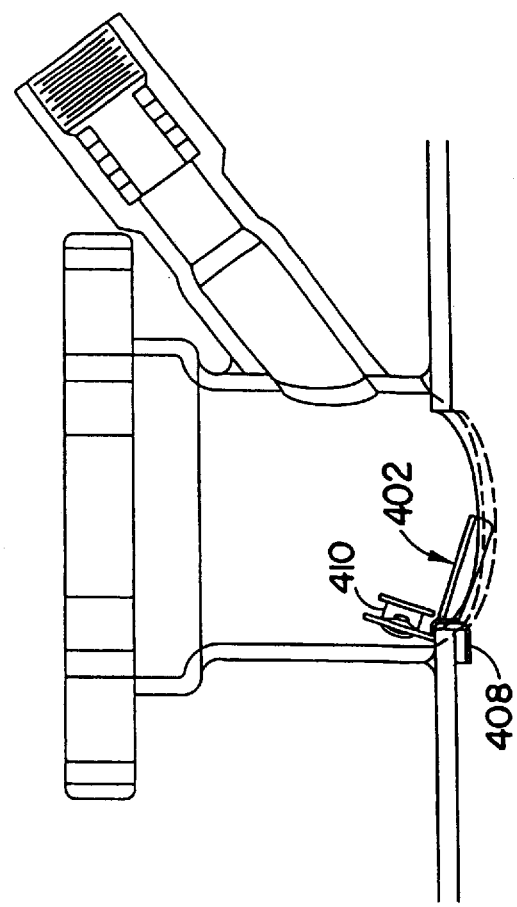
FIG. 19 INSTALLED POSITION

METHOD AND SYSTEM FOR INSTALLING CABLE IN PRESSURIZED PIPELINES

BACKGROUND OF THE INVENTION

The field of the invention is systems and methods for installing fiber optic cable or similar cables or conduits underground. More specifically, the invention relates to the installation of such cable or conduit into pressurized pipelines, such as natural gas pipelines.

With the tremendous growth of the Internet and telecommunications services in general, there has been a commensurate growth in the need to carry larger and larger volumes of data over existing and newly added communication lines. Existing copper-based communications lines, however, have a limited carrying capacity, or bandwidth, as compared to fiber optic cable. Conventional copper wires also suffer from the problem that the wire bundles are quite large as compared to their fiber optic counterparts. Additional copper wires could be installed to increase the overall capacity of a communications or data network. However, fiber optic cable is now preferred within the communications industry due to its significant advantages over copper wires.

Currently, in the United States, there are existing large scale fiber optic backbones that stretch across wide areas of the country. Unfortunately, many businesses and consumers cannot connect to this fiber optic backbone because they are located some distance away from the main line. If copper-based lines are connected to the fiber optic backbone, the high speed and high bandwidth advantages of fiber optic cable are lost. In order to take advantage of the increased speed and bandwidth provided by fiber optic cable lines, shorter segment fiber optic lines need to be laid to reach these businesses and consumers.

Unfortunately, it is a difficult and costly procedure to lay fiber optic cable in developed regions where infrastructure such as roads, utilities, and the like are already in place. For example, it can be costly to obtain the requisite right-of-ways or easements from numerous different property owners. It can also be very costly to dig trenches to lay fiber optic cable. In addition, it is also often necessary to obtain the approval of various state and local government agencies before such work can begin. This can significantly increase the overall cost and delay the completion of the installation.

Existing gas pipelines have been considered as one potential conduit that can be used to carry fiber optic cable. By using existing gas pipelines, there is no need to obtain numerous right-of-ways or easements, since the fiber optic cable simply resides within the pipeline. In addition, long trenches do not have to be dug to lay the fiber optic cable. However, using gas pipelines as a route for fiber optic cable typically requires that sections or all of the pipeline be shut down for an extended period of time for installation of the cable. Even if the gas pipeline is not completely shut down, existing techniques interrupt the normal flow of gas.

Accordingly, there is a need for a relatively quick and inexpensive way of installing fiber optic cable, or conduit which can be used to house the cable, into existing pipelines such as natural gas pipelines.

SUMMARY OF THE INVENTION

In a first aspect of the invention, a method of installing cable into a pressurized pipeline includes the step of attaching a first air or pressure lock housing to the pressurized pipeline at a first location, preferably via a first access nipple. A second air or pressure lock housing is attached to the pressurized pipeline at a second location, also preferably via a second access nipple. Duct rod is preferably fed into an entry port of the first access nipple. A rod end guide, such as a guide ball, may be attached to the end of the duct rod via a manipulator within the first air lock housing. The duct rod is pushed or routed to the second location and guided into the second access nipple.

The rod end guide or ball, if used, is then advantageously removed from the duct rod via a second manipulator in the second air lock housing. Fiber optic cable or a similar cable or flexible conduit, is attached to the duct rod. The duct rod and the fiber optic cable or conduit are pulled back through the entry port or pulled forward through the second entry port. The pipeline is then sealed and the first and second air lock housings may then be removed. In the case of conduit installation, the fiber optic or other cable can be installed using conventional techniques at any time after the conduit is installed.

A second and separate aspect of the invention includes the steps of attaching a first drilling nipple to the pressurized pipeline at a first location. A first valve is attached to the first drilling nipple. A duct rod is partially inserted into the entry port of the first drilling nipple to seal the entry port. A cutting or drilling tool is attached to the valve, and sealed against the valve. The valve is opened. A pipe cutter of the cutting tool is extended through the open valve to cut or drill a hole into the pressurized pipeline through the first drilling nipple. The cutter is withdrawn and the valve is then closed. The cutting tool is removed.

A first air lock housing is installed on the first valve. The valve is opened and the pressure is equalized between the first air lock housing and the pressurized pipeline. A guide ball or similar duct rod end guide may be attached onto the end of the duct rod using a first manipulator in the first air lock housing.

A second drilling nipple is attached to the pressurized pipeline at a second location. The exit port of the second drilling nipple is sealed. A second valve is attached to the second drilling nipple. A cutting or drilling tool is attached and sealed against the valve. The valve is opened. A cutter is extended from the cutting tool and a hole is cut or drilled into the pressurized pipeline through the second drilling nipple. The cutter is withdrawn and the valve is closed. A second air lock housing is installed on the second drilling nipple. The second valve is opened and pressure is equalized.

A duct rod is pushed along inside of the pressurized pipeline and guided into the second drilling nipple. At the second drilling nipple, the guide ball or other rod end guide, if any, is removed from the duct rod with a second manipulator. The duct rod is attached to a fiber optic cable or conduit. The duct rod and the conduit are pulled through the pipeline (either back or forward). First and second completion plugs are installed on the first and second drilling nipples. The pressure is released in the first and second air lock housings. The first and second air lock housings and the first and second valves can then be removed.

In another aspect of the invention, a guide trough can be advantageously deployed using a manipulator in the air lock housing. The guide trough receives the duct rod or conduit and directs the duct rod or conduit through the exit port. The guide trough is preferably designed to provide guidance for duct rod, fiber optic cable, or conduit without changing troughs. The deployable trough and shield are removably stored in the second and/or first air lock housing. The trough may be left in the pipeline permanently. The trough may be perforated to reduce flow resistance. If the trough is not used, the cable, guide rod or conduit can be guided into the exit gland without use of a trough by the manipulator.

In yet another aspect of the invention, a preferably plastic conduit is used in place of the duct rod. The conduit is typically driven by a driving mechanism and enters the pressurized pipeline via the entry port. The conduit may be used in the methods described above, in place of the duct rod. The fiber optic cable is then pushed, pulled or air-blown through the plastic conduit using conventional installation techniques.

In another aspect of the invention, when a cable is directly installed, a mechanism for sealing the cable to the gas pipeline is employed. For conduit, a conduit seal is installed between the conduit and pipeline, and a cable seal is installed between the cable inserted into the conduit (at a later time) and the conduit.

The method and apparatus allows for the installation of fiber optic or other cable into pressurized gas pipelines without requiring any shutoff or interruption in gas service. In addition, no bypass pipeline is needed to maintain service to customers connected to the pipe section where cable/conduit is being installed.

The invention resides as well in sub-combinations of the methods and systems described.

It is an object of the invention to provide a method and system for installing fiber optic or similar cable or conduits into existing pressurized gas pipelines without interrupting the flow of gas in the pipeline.

It is also an object of the invention to provide a method for installing fiber optic cable with use of existing standard fittings, to a large extent, to assist in the deployment and reduce the cost of the fiber optic cable installation.

BRIEF DESCRIPTION OF THE DRAWINGS

FIG. 3 is a schematic view of the system and methods of the present invention, with an installation device pulling the duct rod and fiber optic conduit back through the pressurized gas pipeline.

FIG. 4A is a front view of a guide trough.

FIGS. 4B, 4C and 4D are section views taken at lines 4B—4B, 4C—4C, and 4D—4D of FIG. 4A.

In FIGS. 6 and 7, the pipe nipple, valve, and air lock components are the same on the inlet and exit ends, although they are not fully illustrated on the inlet end. For purposes of illustration, the airlock on the inlet end of FIG. 6 is replaced with the pipe drilling or cutting machine, while in FIG. 7, a top view of the drilling nipple and the hot-tape gate valve is shown.

FIG. 9 is a section view of another embodiment for use with conduit or duct rod.

FIG. 10 is a side view of the manipulator of FIG. 8 in the pick up position.

FIG. 11 is a front view thereof.

FIG. 12 is a side view of the manipulator of FIG. 9 in the plug in position.

FIG. 13 is a section view of an end coupler aligned for engagement with the conduit end shown in FIGS. 9–12.

FIG. 14 is a section view of the end coupler and conduit end of FIG. 13 coupled together.

FIG. 16 is a top view of a corner shield.

FIG. 17 is a side view thereof also showing engagement of the corner shield by a manipulator.

FIG. 18 is a top view showing the corner shield of FIG. 16 installed in a pipeline.

FIG. 19 is a side view of the installation shown in FIG. 18.

DETAILED DESCRIPTION OF THE PREFERRED EMBODIMENTS

Figure 1:
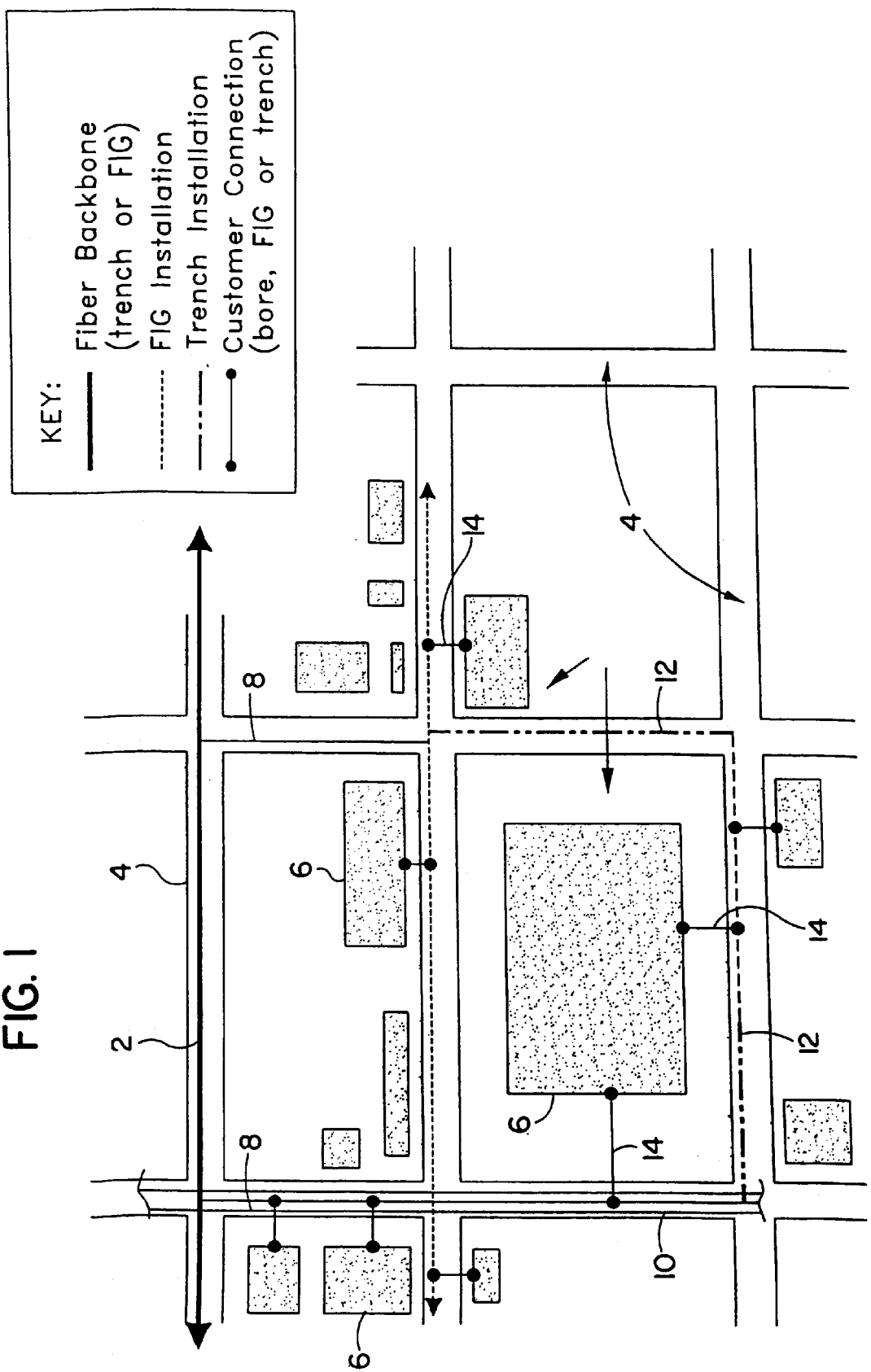
FIG. 1 is a plan view of a geographical area that has installed fiber optic cable or conduit in underground pressurized gas pipelines.

FIG. 1 illustrates a map or plan view of a portion of an urban area such as a city, town, university campus, etc. A main fiber optic backbone 2 runs underneath one or more of the streets 4. Various buildings 6 are dispersed in the vicinity of the main fiber optic backbone 2. These buildings 6 can be individual properties, or alternatively, the buildings 6 can be campuses consisting of multiple properties. Fiber optic conduit 8 that contains one or more bundles of fiber optic cable is shown branching from the main fiber optic backbone 2 under the streets 4. The fiber optic conduit 8 is located in pressurized gas pipelines 10 located underground. The fiber optic conduit 8 is installed in accordance with the methods and devices described in below.

Still referring to FIG. 1, in some of the streets 4 there are no existing pressurized gas pipelines 10, or the pipeline size or available capacity is such that it is not suited for installation of conduit or cable. In this case, the fiber optic conduit 8 is preferably installed in a conventional manner by digging trenches 12 or boring holes through which conduit can be installed. The trenches 12 are preferably dug to meet with existing pressurized gas pipelines 10. In order to get the fiber optic conduit 8 from the pressurized gas pipelines 10 to the buildings 6, individual customer connections 14 are installed to bring the fiber optic cable (contained within fiber optic conduit 8) directly to a customer site. In some instances, such as the larger building 6 shown in the center of FIG. 1, multiple customer connections 14 may be made.

The customer connections 14 may be installed in various ways. For example, a trench 12 can be dug to lay the fiber optic conduit 8 from the pressurized gas pipeline 10. Alternatively, a bore can be drilled or otherwise formed to route the fiber optic conduit 8 into a building. It is also possible that the fiber optic conduit 8 can be directly fed into the pressurized gas pipeline 10 leading to the building 6. This method may be more feasible (due to capacity limitations) where larger diameter service line pipes are used, for example, where the business 6 is a high volume user of natural gas.

Figure 2:
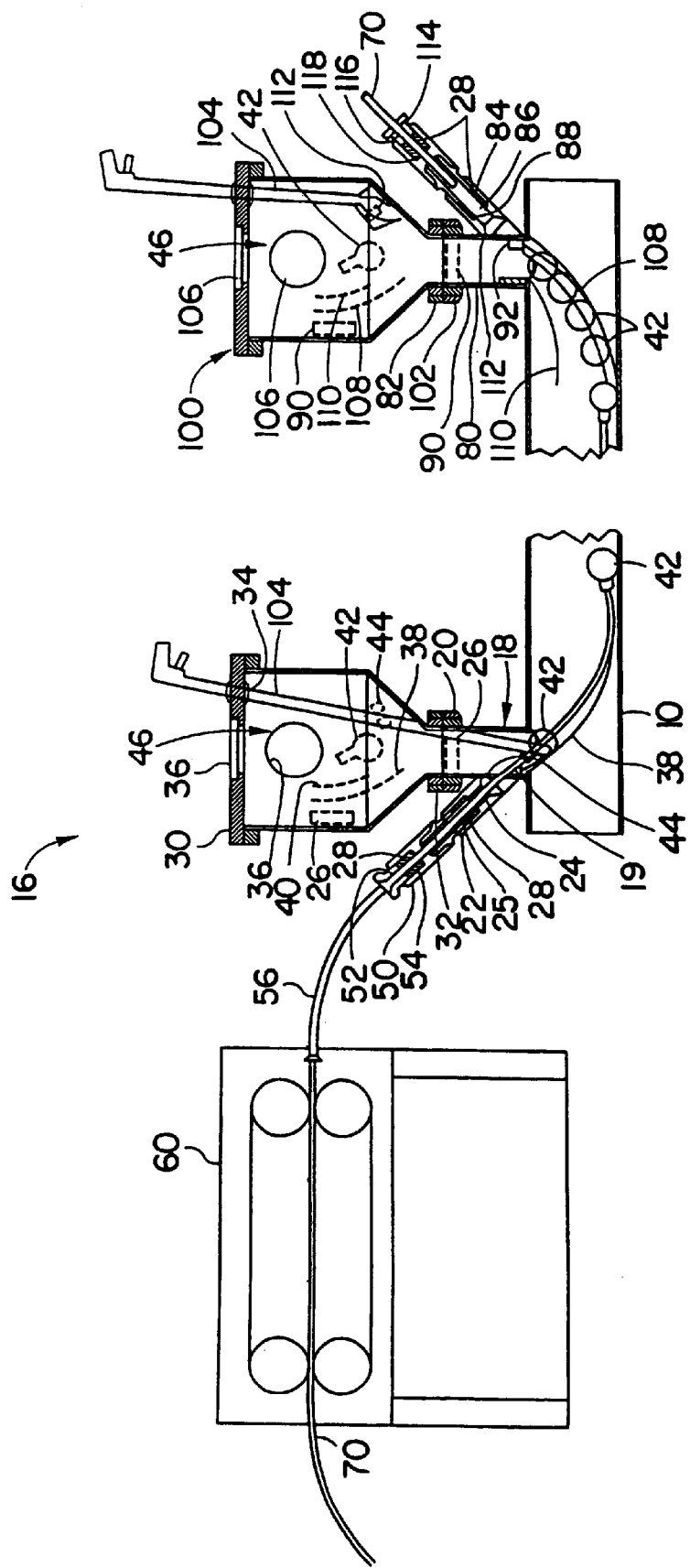
FIG. 2 is a schematic view of the system and methods of the present invention, with an installation device pushing a duct rod and guide ball through a pressurized gas pipeline.

Referring now to FIGS. 2 and 3, a system 16 is shown for the installation of fiber optic conduit. A first access or drilling nipple 18 is attached to the exterior of the pressurized gas pipeline 10, typically by welding. The first drilling nipple 18 includes a flange portion 20 including an entry gland 22. The flange portion 20 is preferably at an angle of 30–40° to the pipeline, to clear holes while maximizing the feeding force in the direction of the pipeline, and to minimize bending of cable. The entry gland 22 and the first drilling nipple 18 connect into the interior or lumen of the pressurized gas pipeline 10. The entry gland 22 can include a bore 24 that at one end receives a split plug seal 44, if needed to temporarily seal the gland while changing fittings or packings. The entry gland 22 also includes a recess 25 for holding a temporary packing material 28 such as TEFLON (resinous fluorine polymers) or a permanent elastomer seal such as VITON (synthetic rubber). A first completion plug 26 is shown in phantom in the first drilling nipple 18. The first completion plug 26 is removable from the first drilling nipple 18 as described below. The angle of the entry/exit port and the flange portion 20 is preferably optimized to allow the maximum possible bend radius for the cable or conduit to produce the greatest amount of force in the direction of the pipe when pushing axially on the duct rod or conduit from outside the pipe.

A first pressure or air lock housing 30 is mounted to the flange portion 20 of the first drilling nipple 18, preferably via a flange and bolts 32. The first air lock housing 30 includes a interior portion or space 46 where various components and tools can be hung, placed in receivers or otherwise stored. A first manipulator 34 extends through the first air lock housing 30 into the space 46. Preferably, the first manipulator 34 includes one or more manipulator arms that can be rotated and/or extended at a wide angle from vertical within the first air lock housing 30. The first manipulator 34 is sealed against gas pressure when the first air lock housing 30 is pressurized. The first air lock housing 30 also includes viewing ports 36 in the top and side of the first air lock housing 30. The viewing ports 36 permit an operator to visually observe the interior portion of the first air lock housing 30 and first drilling nipple 18 and the internal portion of the pipeline in the vicinity where the access hole is drilled or cut.

As shown in dotted lines in FIG. 2, inside the first air lock housing 30 is the first completion plug 26, a first guide trough 38, a corner shield 40, a guide ball 42, and tapered split plugs 44. These items are movable or installable within the first air lock housing 30 via the first manipulator 34 and can be used in the installation of the fiber optic cable or conduit 8. The first guide trough 38 and the corner 40 shield are preferably coated with a low friction polymer coating such as TEFLON.

A removable packing gland 50 is engaged to and seals with the entry gland 22. The removable packing gland 50 includes a bore 52 connecting to the bore 24 of the entry gland 22. The removable packing gland 50 also includes a recess 54 for holding packing seal 28 such as TEFLON or VITON. A guide duct 56 is preferably located on an end of the removable packing gland 50 to aid in guiding the duct rod 70 through removable packing gland 50.

Still referring to FIG. 2, a first driving mechanism or rod driver 60 is located relatively near the first drilling nipple 18 and the first air lock housing 30. The first rod driver 60 provides the moving force to push and pull the duct rod 70 through the pressurized gas pipeline 10. Preferably, the first rod driver 60 is a commercial tractor feeder. The first rod driver 60 engages or grips the duct rod 70. The duct rod 70 is preferably made from a glass-reinforced composite polymer that is typically used as a snake for cable pulling. The duct rod 70 advantageously includes a polymer coating such as TEFLON or the like to aid in pushing and pulling through the pressurized gas pipeline 10. The duct rod can be any of those commercially available with a diameter that fits the dimensions of the removable packing gland 50, typically 10–12 mm OD.

FIG. 2 also shows the guide attachment, in this case a ball 42 connected to the end of the duct rod 70. The guide attachment 42 is removably connected to the duct rod 70 during the installation process if it is too large to fit through the entry/exit glands. The guide attachment 42 helps prevent the duct rod 70 from getting stuck in the pressured gas pipeline 10 from such things as burrs, slag, and the like. The guide attachment 42 preferably has an outer diameter small enough to fit through the hole drilled in the pipeline typically about 30–60 mm. The invention can be used with small diameter or larger diameter pipelines. FIG. 2 also shows the first guide trough 38 connected to the first drilling nipple 18. The connection is made via studs 19 or other suitable mans for attaching the trough in a stable manner. The first guide trough 38 is deployed from the first air lock housing 30 and helps in the introduction and removal of the duct rod 70 and fiber optic conduit 8.

Still referring to FIG. 2, a second access or drilling nipple 80 is attached to the exterior of the pressurized gas pipeline 10, typically from about 100 to 500 meters from the first nipple. The second access or drilling nipple 80 includes a flange portion 82 and an exit gland 84. The exit gland 84 in the second drilling nipple 80 connects with the interior of the pressurized gas pipeline 10. The exit gland 84 includes a bore 86 tapered at one end for receiving split plugs 112. The exit gland 84 also includes a recess 88 for holding a packing material 28. A second completion plug 90 is shown in dotted lines in the second drilling nipple 80. The second completion plug 90 is removable from the second drilling nipple 80.

A second air lock housing 100 is mounted to the flange portion 82 of the second drilling nipple 80, preferably via bolts 102. The second air lock housing 100 also includes an interior portion or space 46 where various components and tools can be stored. A second manipulator 104 extends into the interior space 46 of the second air lock housing 100. Preferably the second manipulator 104 includes a manipulator arm that can rotate and/or extend at a wide sweep of angles from vertical within the second air lock housing 100. The second manipulator 104 is sealed against the gas pressure when the second air lock housing 100 is pressurized. The second airlock housing 100 also includes viewing ports 106 in the top and side of the second airlock housing 100. The viewing ports 106 permit an operator to visually observe the interior portion of the second air lock housing 100 and to see into the pipeline.

As shown in dotted lines in FIG. 2, the second completion plug 90, a second guide trough 108, a corner shield 110, a guide ball 42, and tapered split plugs 112 are stored inside the second air lock housing 100. These items are moveable/installable within the second air lock housing 100 via the second manipulator 104.

A second removable packing gland 114 is engaged to and sealed with the exit gland 84. The second removable packing gland 114 includes a bore 116 connecting with the bore 86 of the exit gland 84. The second removable packing gland 114 also includes a recess 118 for holding packing material 28.

Referring now to FIG. 3, a second rod driver 124 is positioned near the second drilling nipple 80 and the second air lock housing 100. The second driving mechanism 124 feeds the fiber optic cable or conduit 8 into the pressurized gas pipeline 10 via the second removable packing gland 114.

Preferably, the second driving mechanism 124 is a commercial tractor feeder. A guide duct 120 is advantageously located on an end of the second removable packing gland 114 to aid in guiding fiber optic conduit 8 through the second removable packing gland 114. Both rod drivers can push or pull the rod, fiber optic cable or conduit as required.

Referring back to FIG. 2, the second guide trough 108 is shown in its deployed configuration, wherein the second guide trough 108 is positioned by attaching to pipeline 10 or second drilling nipple 80 via studs 92 or another suitable mechanism. The second guide trough 108 aids in the removing and installing the duct rod 70 and fiber optic cable or conduit 8 into the pressurized gas pipeline 10. A cross-sectional view of the second guide trough 108 is shown in FIG. 4. The second guide through 108 is preferably coated with a low friction polymer coating such as TEFLON. As shown in FIG. 2, a second corner shield 110 is also shown in the deployed state. The second corner shield 110 helps prevent the duct rod 70 and fiber optic cable or conduit 8 from getting stuck or being abraded or cut during installation. Preferably, the second corner shield 110 is also coated with a low friction polymer such as TEFLON. Teflon coating the guide trough and corner shields reduces drag when installing cable, conduit or rod.

The guide troughs support the cable, conduit or rod to prevent kinks at the infeed end. They centralize and guide the cable, conduit or rod on the outfeed end. The corner shields protect the cable, conduit, or rod from abrasion and gouging caused by the rough machined edges of the drilled holes.

With reference to FIGS. 2 and 3, showing the system installed, in an overview of the method of introducing the fiber optic conduit 8 into the pressurized gas pipeline 10, generally the duct rod 70 is initially introduced into the pressurized gas pipeline 10 via an entry port in the first access or drilling nipple 18. The entry port preferably extends through the gland 22 and the first removable packing gland 50. However, the entry port can also include just the entry gland 22.

After the corner shields and troughs (if used) are deployed within the first air lock housing 30, the duct rod 70 is advanced through the pressurized gas pipeline 10. Corner shields and troughs are optionally also deployed and removed in the second air lock housing 100. The duct rod 70 then exits the pressurized gas pipeline 10 via an exit port in the second drilling nipple 80. The exit port preferably includes the exit gland 84 and the second removable packing gland 114. However, the exit port can include just the exit gland 84. A fiber optic cable or conduit 8 is then attached to the end of the duct rod 70. The duct rod 70 and the fiber optic conduit 8 are then pulled back through and out of the pressurized gas pipeline 10. The duct rod is preferably rewound onto a spool for reuse at the next segment of pipeline. The conduit can be joined to the next adjacent segment of conduit or left open for customer connection once a fiber optic cable is installed within the conduit using conventional installation techniques. With conduit installed and sealed at both ends, cable can be installed at a later date when convenient.

Turning now in detail to the system and methods of the invention, the installation begins by attaching (e.g., welding) the first drilling nipple 18 to the pressurized gas pipeline 10. The first removable packing gland 50 is installed in the entry gland 22. The leading end of the duct rod 70 is then inserted into the first removable packing gland 50 and the entry gland 22 to aid in sealing off pressurized gas. A drilling machine designed for drilling operations under gas pressure, such as a Mueller C-136 or similar drilling machine, is attached, e.g., bolted and sealed onto the drilling nipple. The pressurized gas pipeline 10 is then drilled via a drilling or cutting machine 250 (shown installed in FIG. 6). The slug is removed from the pressurized gas pipeline 10 and the first drilling nipple 18 is sealed with the first completion plug 26. The first air lock housing 30 is then mounted to the first drilling nipple 18 via bolts 32. Use of drilling nipples and drilling machines on pressurized pipelines is well known. Other commonly known techniques for creating an opening into the pipeline may also be used.

Using the viewing ports 36, an operator then uses the first manipulator 34 to substantially equalized the pressure in the first air lock housing 30 with the pressurized gas pipeline 10. The first completion plug 26 is removed and stored within the first air lock housing 30 via the manipulator 34. Next, the first guide trough 38 is deployed using the first manipulator 34. The first guide trough 38 is mounted to the studs 19. The end of the duct rod 70 is slowly fed into the nipple 18. The guide ball 42 is attached on the end of the duct rod 70 via the first manipulator 34. The guide ball 42 and the duct rod 70 are then pushed down the first guide trough 38 and through the pressurized gas pipeline 10. The first driving mechanism 60 provides the force needed to push the duct rod 70 and guide ball 42 along the pressurized gas pipeline 10. A dry lubricant may be added to the exterior of the duct rod 70 before it enters gland 50. Gas leakage is minimized by the glands and seals.

The second air lock housing 100 is installed in a similar manner as described above for the first air lock housing 30. The second drilling nipple 80 is attached to the pressurized gas pipeline 10. The second removable packing gland 114 is installed in the exit gland 84. A short piece of duct rod 70 is then inserted into the second removable packing gland 114 and secured to aid in sealing off the pressurized gas. The pressurized gas pipeline 10 is then drilled or otherwise opened up within the second drilling nipple 80. The slug is removed from the pressurized gas pipeline 10 and the second drilling nipple 80 is sealed with the second completion plug 90. The second air lock housing 100 is then mounted to the second drilling nipple 80 via bolts 102.

Using the viewing ports 106, an operator then uses the second manipulator 104 to substantially equalize the pressure in the second air lock housing 100 with the pressurized gas pipeline 10. The second completion plug 90 is removed and stored within the second air lock housing 100 via the manipulator 104. Next, the second guide trough 108 is deployed using the second manipulator 104. The second guide trough 108 is mounted on studs 92. The second air lock housing 100 can be installed on the pressurized gas pipeline 10 either before, after, or during the installation of the first air lock housing 30.

The shape of the second guide trough 108, as shown, for example in FIG. 4, leads the advancing guide ball 42 and duct rod 70 into the second drilling nipple 80. The first guide trough 38 may also have this same profile. When the guide attachment 42 is part way up the second guide trough 108, the operator uses the second manipulator 104 to remove the guide attachment 42 and store the guide attachment 42 in the second air lock housing 100. The end of the duct rod 70 is then slowly advanced into the exit gland 84, if necessary with the help of the second manipulator arms, and pushes out the short piece of duct rod 70 that was sealing the second removable packing gland 114. Split plugs 44, 112 can be inserted from the inside of the first and second drilling nipples 18, 80 via the first and second manipulators 34, 104 to seal the system while the glands are arranged to pull the duct rod 70 and/or fiber optic conduit 8 through the pressurized gas pipeline 10.

With the duct rod 70 now pushed outside the exit gland 84, the fiber optic cable or conduit 8 is connected to the end of the duct rod 70, preferably via a cable grip 126 attached to the end of the duct rod 70. Once the duct rod 70 and the cable grip 126 are connected, the split plugs 112 are removed via the second manipulator 104. The first driving mechanism 60 then reverses direction and begins to pull the duct rod 70 and fiber optic conduit 8 back through the pressurized gas pipeline 10. At the same time, the second driving mechanism 124 feeds the fiber optic conduit 8 into the guide duct 120. The duct rod 70 is pulled at the same speed that the fiber optic conduit 8 is fed into the pressurized gas pipeline 10. A lubricant may be added to the exterior of the fiber optic conduit 8.

Alternatively, the duct rod at the entry can be pulled through to the end of its roll, and the fiber optic cable or conduit attached at the entry and pulled through the pipe from that point to the exit location. This approach allows the rod to be coiled at the exit location and be closely located to the next pipeline segment entry location. This facilitates multiple segment installations.

The first removable packing gland 50 is then sized to permit passage of the cable grip 126 such that the entry gland 22 (which will now be used as an exit gland since the duct rod 70 and fiber optic conduit 8 are being pulled in the opposing direction) can seal on the exterior of the cable grip 126 and fiber optic conduit 8. The duct rod 70 and fiber optic conduit 8 are then pulled out the first drilling nipple 18 into a final position. Once the duct rod 70 and fiber optic conduit 8 are in the final position, the tapered split plugs 44, 112 are placed into position using the first and second manipulators 34, 104. The first and second removable packing glands 50, 114 are then removed along with any packing material 28 and final split plug seals are installed.

The entry gland 22 and the exit gland seals 84 are finally secured and further sealed via a threaded nut 352 and service head adapter with shield nut 360 (shown in FIG. 15 and described below). The first completion plug 26 and the second completion plug 90 are retrieved and installed in the first and the second drilling nipples 18, 80 using the first and second manipulators 34, 104, respectively. The pressure is reduced in the first air lock housing 30 and second air lock housing 100 and the first and second air lock housings 30, 100 are removed from their respective flanges 20, 82.

The fiber optic conduit 8 containing fiber optic cable is now installed in the pressurized gas pipeline 10. The method and device are capable of installing fiber optic conduit 8 into pressurized gas pipelines 10 without stopping or impeding the flow of natural gas. In this manner, existing pressurized gas pipelines 10 can be installed with fiber optic conduit 8 without disruption in gas service to customers.

Figure 5:
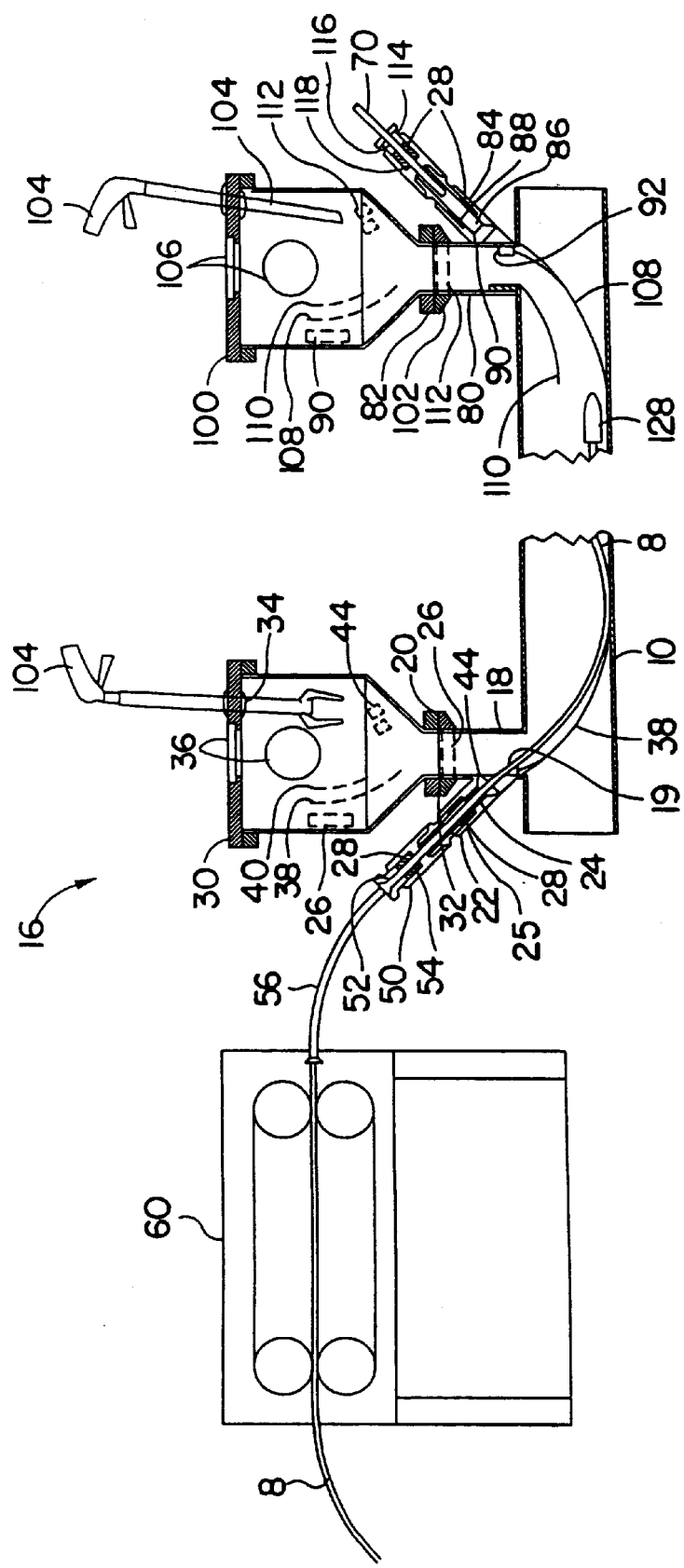
FIG. 5 is a side view of the installation device according to alternative embodiment of the invention.

In an alternative embodiment of the invention, shown in FIG. 5, the duct rod 70 is replaced with semi-rigid fiber optic or other conduit 8. A bull nose or bullet head 128 may be located on the end of the conduit 8 and allows the fiber optic conduit 8 to be pushed through the glands 22, 84 and pressurized gas pipeline 10 without the need for a separate duct rod 70 or for a rodding gland assembly 50, 118. As with the prior method, the drilling nipples 18, 80 and the first and second air lock housings 30, 100 would also be employed. The guide attachment 42, however, would not be needed. In this aspect of the invention, the fiber optic conduit 8 needs to be sufficiently rigid to permit the snaking of the fiber optic conduit 8 through the pressurized gas pipeline 10 for distances anticipated to be found between customer connection locations in metro environments. For example, the fiber optic conduit 8 can include one or more reinforcing layers wrapped around a central core conduit or, a duct rod can be inserted into the conduit. Alternatively, the fiber optic conduit 8 can be made of a composite polymer that has sufficient rigidity such that the fiber optic conduit 8 can be snaked through the pressurized gas pipeline 10. Pressurizing the conduit with compressed gas is another option for increasing the conduit rigidity.

Figure 6:
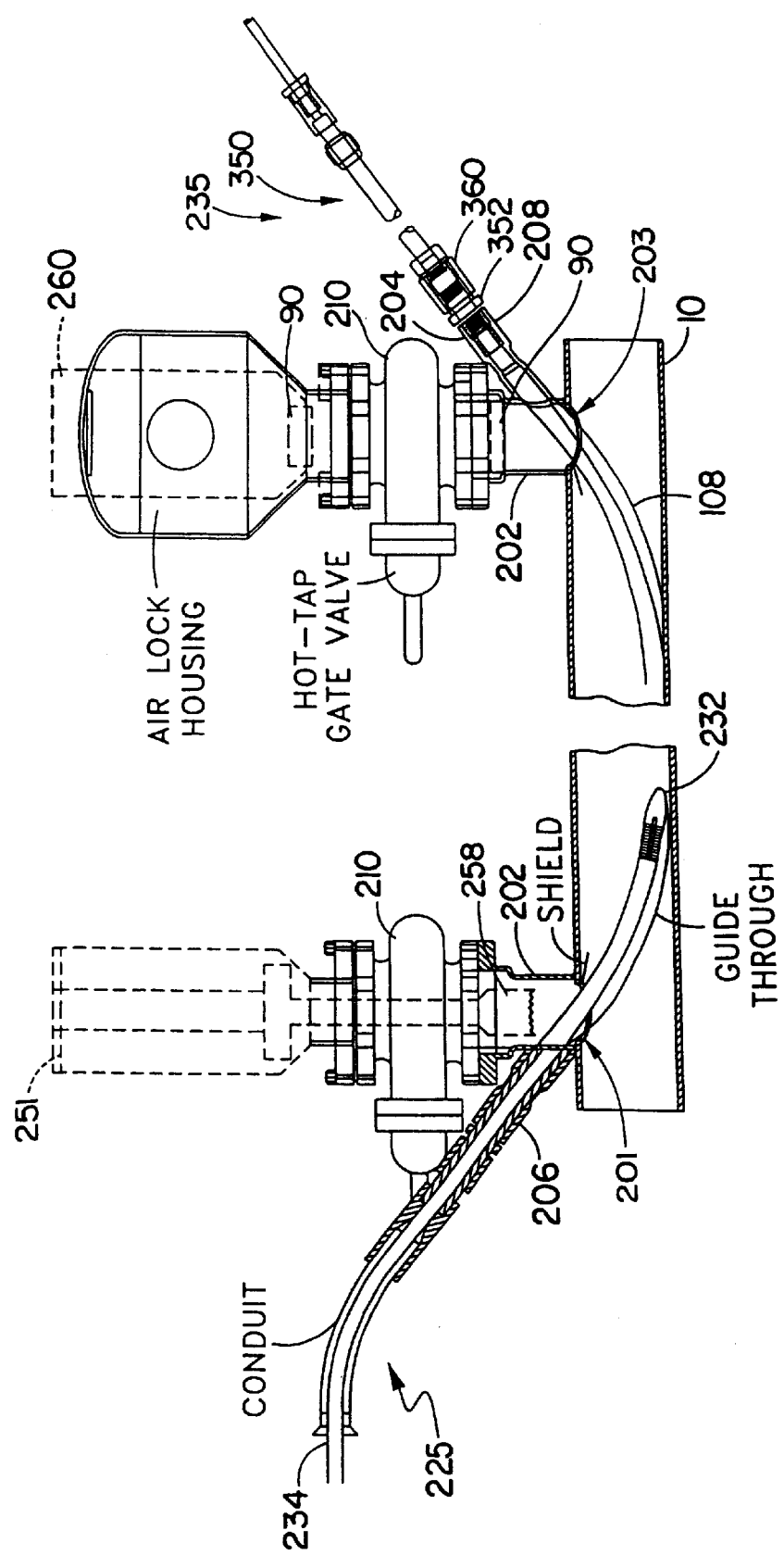
FIG. 6 is a schematic view of an another alternative system and method for installing conduit directly.

Referring now to FIG. 6, in an alternative system and method, standard "hot-tap" drilling nipples 202 are modified with a side arm 204 containing packing glands 208 at their outer ends. The nipples 202 are located in position on the gas pipeline 10 and welded in place. A gate valve 210 and drilling machine 250 are attached to the drilling nipple 202. The valve 210 is opened. The drilling machine 250 extends a cutter 252 through the open valve and cuts a hole in the pipeline, within the drilling nipple 202. The cutter 252 is withdrawn back out through the open valve, and the valve is then closed. The drilling machine 250 is then removed (e.g., unbolted) leaving the gate valve in place. The air lock housing 30 is attached to the gate valve and the valve opened, giving access to the pipe through the air lock housing 30.

After the fiber optic cable or conduit installation is complete, the gate valve is closed, the air lock housing removed and a completion or stopping machine 260, such as a Mueller H-17235 or equivalent, is attached and sealed onto the drilling nipple, preferably via bolts. The completion machine 260 holds the completion plug 26 or 90. The valve is opened and the completion plug 26 or 90 is installed into the upright neck of the drilling nipple and tightened using the completion machine 260. The completion machine 260 and, gate valve are removed and a blind flange is installed over the nipple.

Figure 7:
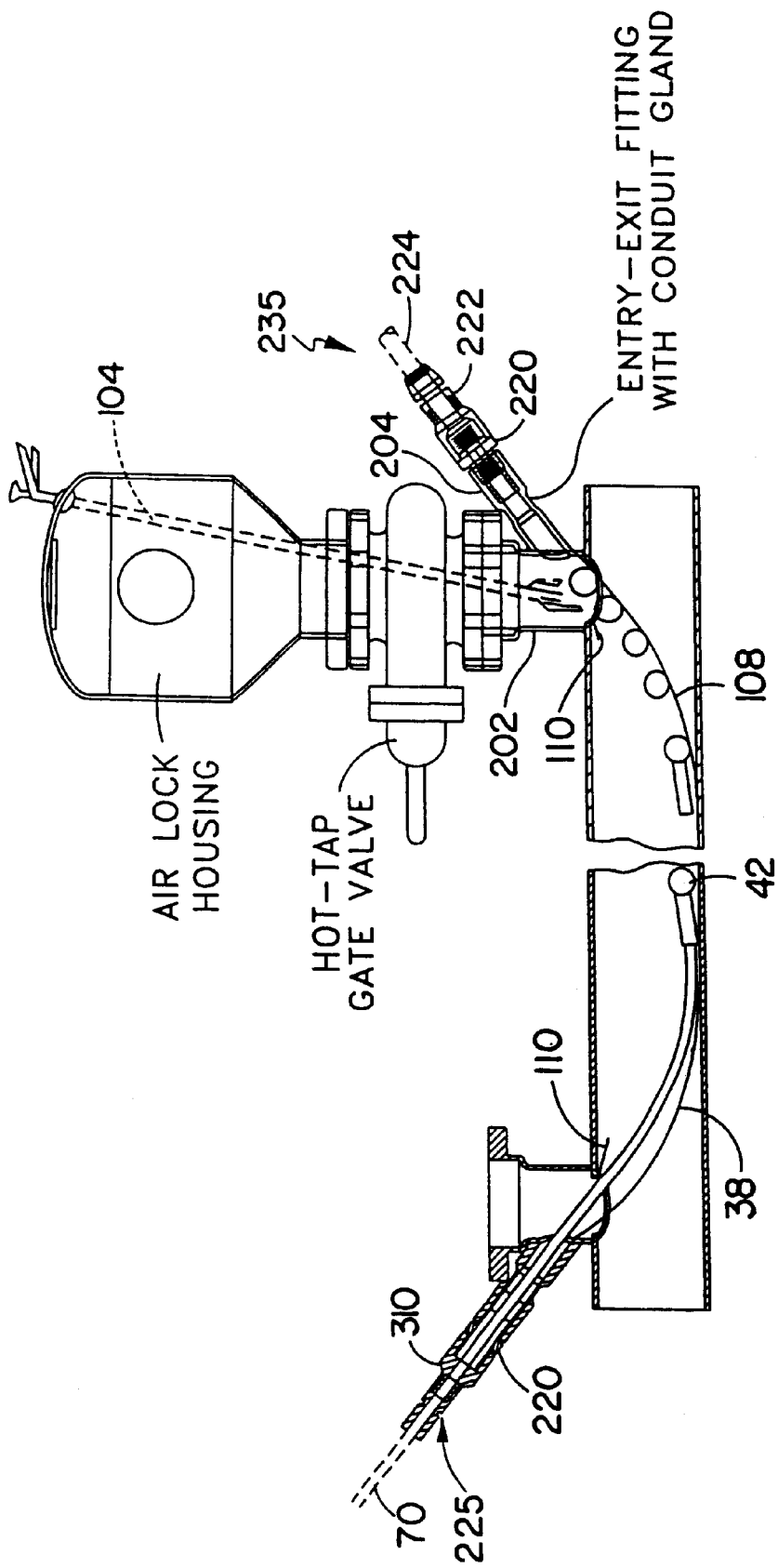
FIG. 7 is a schematic view of another method and system using a guide rod to pull cable or conduit back through a pipeline.

Referring to FIG. 7, when duct rodding is used, the following steps are preferably performed:

1. Before drilling the hole in the pipeline, conduit gland nut 222 or 352 and a rodding adapter gland nut 222 are attached to the entry/exit fitting 204 on the drilling nipple 202. On the infeed end 225, the rod 70 is inserted through the glands, and the rod guide attachment 42 is attached to the rod 70. The rod attachment is retracted into the recess at the inner end of the entry/exit fitting if its size detrimentally blocks the pipe entry hole 203. On the outfeed end 235, a short length of rod 224 is inserted into the rodding adapter 222 to act as a temporary plug.

2. Holes are cut in the pipeline. The air lock housings are attached as explained above.

3. Using the manipulator 34, 104, the guide troughs 38, 108 and corner shields 110 are installed from inside the air lock housings.

4. The rod 70 is pushed until the guide attachment 42 is at the top of the trough 108 at the outlet end 235. Alternatively, if no guide trough is used, the manipulator arms can be used to grasp the guide rod and maneuver it into the exit gland. Using the manipulator 104, the guide ball is removed and the rod is guided into the entry/exit fitting 204. Alternatively, the duct rod 70 is attached to the short piece of duct rod that was pre-installed in the exit gland. Once attached, the pre-installed rod piece 224 can be used to pull the duct rod 70 through the exit. In some applications, the duct rod or conduit may be snaked or driven through by hand, especially on shorter runs.

5. The rod is pushed through the glands, pushing out the plug 224.
6. By attaching a fiber optic or other type cable or a conduit to either end of the rod, installation can proceed with forward or backward direction by pushing and/or puling the duct rod.
7. Split rubber plugs can be installed in the recesses at the inner ends of the entry/exit fittings using the manipulator to control leaking until the proper seal packing is installed in the glands.
8. Completion plugs area installed. The air lock housings and valves are removed, as explained above.

Figure 8:
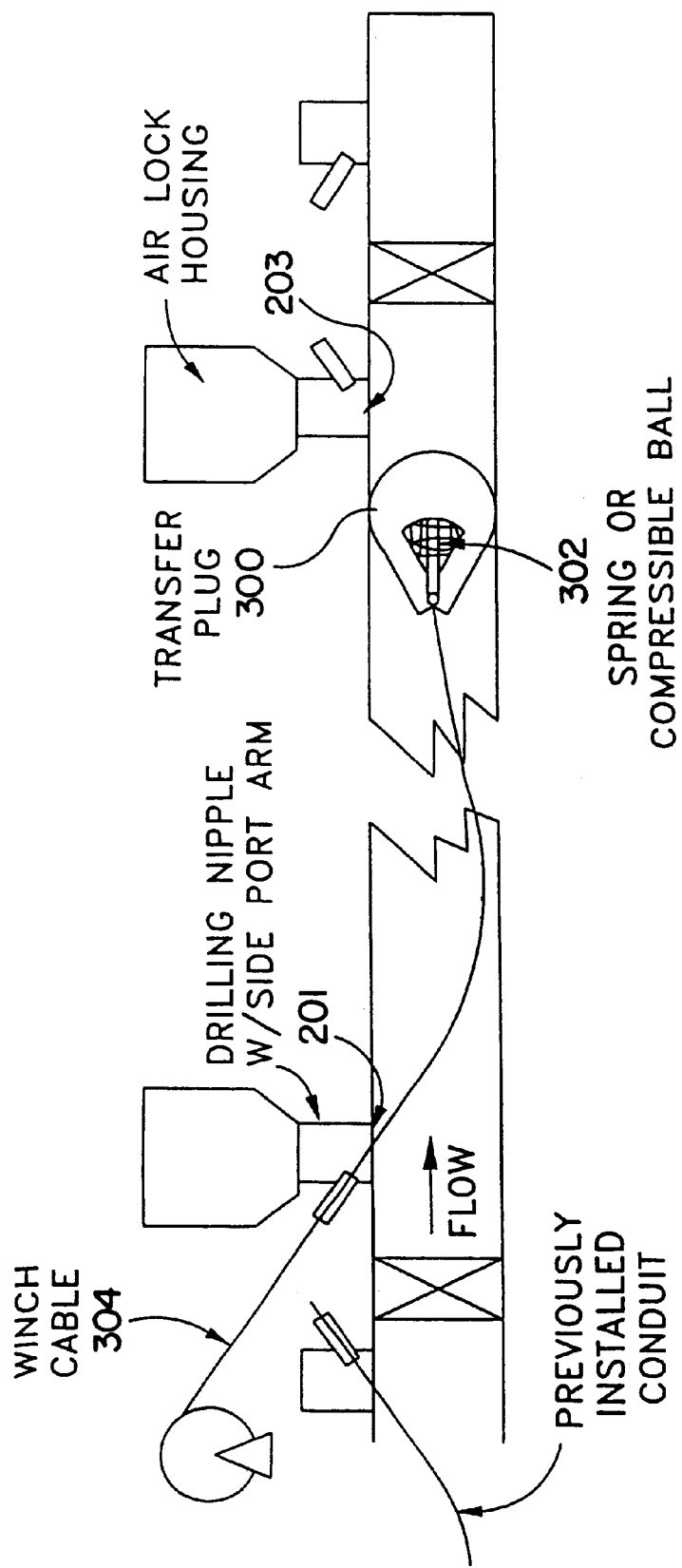
FIG. 8 is a schematic diagram of a transfer plug embodiment.

In place of the driving apparatus 60 and 124, in an alternative design shown in FIG. 8, a transfer plug 300 is installed into and removed from the pipeline via the air lock housings. The transfer plug 300 has a spring-like frame 302 which causes it to pop open after it is pushed through the entrance hole 201 cut into the pipeline. Alternatively, the transfer plug can be constructed with a solid, compressible core with a "memory" shape similar to the pipeline cross section. Preferably, the parachute has a diameter just slightly less than the pipeline diameter. A draw cable, rope, or wire 304 is attached to the transfer plug 300. The gas flowing through the pipe carries or blows the parachute 300 from the first drilling nipple to the second drilling nipple, where it is extracted through the exit hole 203, using the manipulator. The draw cable 304 is separated from the transfer plug and is pulled through the exit glands using an extractor hook 306 on the end of a piece of duct rod 70. The back end of the draw wire 304 is attached to a cable or conduit. By pulling on the draw wire 304, the cable or conduit is pulled through the pipeline. Hence no duct rod is needed to route the conduit through the pipeline in this embodiment. In certain applications, compressed air may be used to blow the transfer plug 300 through the pipeline, instead of the gas. In routing or passing conduit through the pipeline, the conduit may be stiffened, by filling it with compressed gas, or by placing a stiffening element or material in the conduit. The stiffened conduit is easier to route.

FIGS. 9–12 show an alternative design having an end plug 250 having grip rings 252 which secure it into the open end of a conduit 254. The end plug 250 preferably also has a spherical end nose 256, a coupler groove 258, a conical guide collar 260, and a neck 262, as shown in FIG. 13. A manipulator 270 on a fitting 271 attached to the pipeline has a hand 272 adapted to close around the neck 262. The hand 272 is supported on an armature 274 attached to the lower end of the manipulator 270 at a pivot joint 276. A linkage 278 on the armature 274 extends up through or near the armature 274, so that the hand 272 can be pivoted up at an angle, as shown in FIG. 12, by controlling the manipulator handles, outside of the air lock.

A coupler 300 is positioned into a neck 302 of the fitting 271. The coupler has a receptacle 304 adapted to couple onto the end plug 250. The receptacle has a coupling ring 306 slightly smaller than the end nose 256. The receptacle has a conical guide 308 adapted to cooperate with the guide collar 260, to guide the coupler groove 258 into engagement with the coupling ring 306. The receptacle 304 is slidably positioned within a collar 310. A center rod 312 is threaded onto a rod extractor segment 316 which is sealed against the neck 302 by glands 314.

In use, the end plug 250 is maneuvered into position under the manipulator 270. The neck 262 is grabbed by the hand 272, as shown in FIG. 10. Using the linkage 278, the end plug 250 and attached conduit is tilted up into alignment with the coupler 300 in the neck 302. The collar 310 and receptacle 304 is pushed into engagement with the end plug 250. The coupling ring 306 snaps into place around the coupler groove. The end plug 250 and attached conduit can then be pulled out of the neck 302 by pulling on the extractor segment.

Referring to FIGS. 6 and 9–15, if conduit is to be installed directly, the following steps are preferably performed:

1. Before drilling the hole in the pipeline, the conduit gland nut 220 is attached to the entry/exit fitting. The conduit nose fitting 250 is installed on the end of the conduit 254 and pushed into the conduit gland to seal it. A coupler 300, as shown in FIGS. 9 and 13, is inserted into the exit port gland 204 and gland nut 220, shown in FIG. 6.
2. The hole is drilled in the pipeline and the valve and the air lock housing are attached as explained above.
3. Using the manipulator 270, the corner shields 400 are installed into the pipeline from inside the air lock housing, as shown in FIG. 19.
4. The conduit 254 is pushed through until the nose fitting 250 is reachable by manipulator arm 270 at the exit end 235. The manipulator 270 is used to attach the nose fitting 250 to the coupler 300. FIG. 9 shows detailed examples of the manipulator, nose fitting and coupler fittings and how they function as a system.
5. The coupler 300 is used to pull the conduit 254 through the exit gland 204 and gland nut 220
6. A completion plug is installed. The air lock housing and valves are removed as explained above.
7. The conduit 234 is now sealed to the pipeline 10 using a modified service head adapter with shield nut 226, but the interior of the conduit is still open. After the cable is installed in the conduit, it is preferably sealed to the conduit, either at the entry/exit fitting or at a remote end of the conduit. An assembly of appropriate glands will provide the seal in either case.

The guide troughs, guide ball, and corner shields may be omitted or replaced with functional equivalents.

Figure 15:
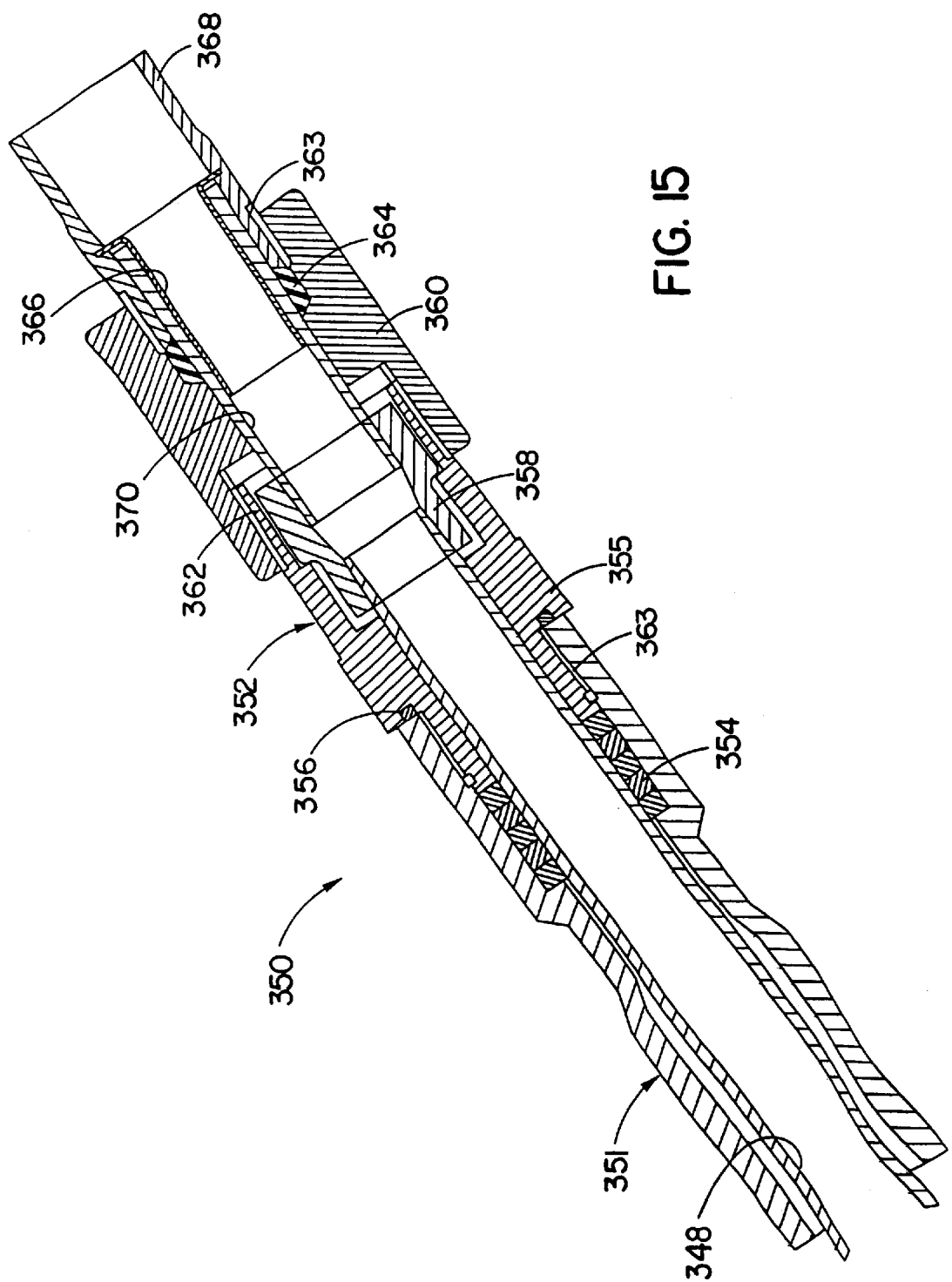
FIG. 15 is a section view of a seal for sealing a conduit after it is pulled or routed through a pipeline.

Turning to FIG. 15, a conduit or other lumen 348 is sealed within a side arm 350 of a pipeline fitting, to prevent escape of pressurized gas. As shown in FIG. 15, a gland nut 352 is threaded into the side arm 350 via machine threads 363. An O-ring 356 at a shoulder 355 on the gland nut 352, and a packing assembly 354 within the side arm 350, provide a pressure tight seal between the gland nut 352 and the side arm 350. The packing assembly 354 also seals against the outside diameter of the conduit 348. The packing assembly includes a stack up of washers, packings, and split opposite packings.

A shield nut 360 is attached to the gland nut 352 via pipe threads 362. A fusion socket reducer 358 surrounds the outside diameter of the conduit 348, within the gland nut 352 and shield nut 360. A pipe section 368 is threaded into the outer end of the shield nut 360, and is sealed against the shield nut 360 by an annular rubber seal 364. A pipe section 370 extends from the pipe section 368, through the shield nut 360 and into the fusion socket reducer 358. A pipe section stiffener 366 is optionally provided within the pipe section 370.

With the design shown in FIG. 15, a pressure tight seal is formed around the conduit 348, without constricting the internal diameter or lumen of the conduit 348. This allows for sufficient installation of fiber cable into the conduit using compressed air.

Turning now to FIGS. 16–19, a corner shield 400 has a pair of arms 402 extending outwardly at an angle from a center clip 408. Each of the arms 402 has a top flange 404 and a side flange 406. A flanged rivet 410 is attached to the clip 408. The clip 408 is adapted to clip onto the edge of a drilled pipeline, as shown in FIG. 19. The flanged rivet 410 is adapted to be grabbed by a hand of a manipulator, such as the hand 272 of the manipulator 270 shown in FIGS. 9–12.

In use, the corner shield 400 is preferably stored within an air lock housing, as described above. The manipulator 270 picks up the corner shield 400 by engaging or grabbing onto the flanged rivet 410 using the manipulator hand, such as the hand 272. The corner shield 400 is then installed onto the edge of the opening, as shown in FIG. 19, using the manipulator 270. The clip 408 holds the corner shield 400 onto the pipeline, via spring force. The corner shield 400 prevents the cable or conduit moving into or out of the pipeline from chaffing or scrapping on the opening drilled into the pipeline.

While the system is preferably used on pipelines of about 10 cm or larger, it may also be used on smaller lines, with modified drilling nipples.

The system and methods may also be used with other types of pressurized pipelines, including pipelines carrying liquids, with appropriate modifications of the seals and glands.

Multiple, interchangeable packing glands allow use of the same entry/exit fitting with many sizes of cable, conduit or rod.

Multiple layers of split packing materials allow changing seals with the cable, conduit, or rod in place.

The duct rod or conduit (with or without stiffening devices) acts as a translating member, i.e., an element that is moved through the pipeline.

Nominal gas leakage may of course occur in using the present system and methods, without affecting the advantageous results. The description herein of sealing, seals, pressure tightness, etc. and steps performed without allowing gas to escape, of course contemplate and include situations where nominal leakage occurs.

If suitably strong manipulators are used, the gate valve is not needed and the air lock housing can be mounted directly to the drilling nipple, as shown in FIGS. 2 and 3. After equalizing pressure, the completion plug could be removed with the manipulator and stored inside the air lock housing.

The attachment of components described above are made pressure-tight, to prevent gas from escaping form the pipeline, using known seals, components and methods, except as specified.

While embodiments of the present invention have been shown and described, various modifications may be made without departing from the scope of the present invention. The invention, therefore, should not be limited, except to the following claims, and their equivalents.

What is claimed is:

1. A method of installing a cable into a pressurized pipeline system comprising the steps of:
    attaching a first pressure lock housing over a first opening at a first location on the pressurized pipeline;
    attaching a second pressure lock housing over a second opening at a second location on the pressurized pipeline, with the first and second pressure lock housings each having an interior space;
    feeding a duct rod through a first seal and into the first opening;
    moving the duct rod through the pipeline to the second location;
    moving a manipulator in the interior space of the second pressure lock housing to engage the duct rod and to move the duct rod through the second opening;
    attaching a cable or conduit to the duct rod; and
    moving the duct rod and cable or conduit back through the pipeline to the first opening.

2. The method according to claim 1, further including the steps of:
    using a first manipulator on the first pressure lock housing to attach a rod end guide, stored in the first pressure lock housing to the end of the duct rod, within the first pressure lock housing; and
    using a second manipulator on the second pressure lock housing to remove the rod end guide from the duct rod within the second pressure lock housing.

3. The method of claim 2 further including the step of viewing the rod end guide through a window in the first pressure lock housing.

4. The method according to claim 1 further comprising the step of deploying a first guide trough from the first pressure lock housing into the pipeline at the first opening using a manipulator and by viewing the manipulator through a window in the first pressure lock housing.

5. The method according to claim 1 further comprising the steps of deploying a first shield into the pipeline at the first opening using the manipulator.

6. The method according to claim 1 further comprising the step of storing a first guide trough in the first pressure lock housing and storing a second guide trough in the second pressure lock housing, and then deploying the first and second guide troughs into the pipeline at the first and second openings using first and second manipulators in the first and second pressure lock housings, respectively.

7. The method according to claim 1 further including the step of:
    attaching first and second drilling nipples onto a continuous section of pipeline not having valves or other obstructions;
    attaching first and second valves onto the first and second drilling nipples, respectively;
    attaching a pipeline drilling apparatus to the first and second valves; and
    drilling into the pipeline, while the pipeline is under operating gas pressure, to create the first and second openings.

8. The method of claim 1 further comprising the steps of engaging the duct rod with the manipulator while viewing the duct rod at the second opening through a window in the second pressure lock housing.

9. A method of installing fiber optic cable or conduit into a pressurized gas pipeline comprising the steps of:
    attaching a first access nipple to the pressurized gas pipeline at a first location;
    inserting a translating member at least partially into an entry port of the first access nipple;
    making a first hole in the pressurized gas pipeline through the first access nipple;
    sealing off the first hole;
    installing a first pressure lock housing on the first access nipple;
    unsealing the first hole and equalizing pressure between the first pressure lock housing and the pressurized gas pipeline;
    attaching a translating member end guide onto the translating member using a first manipulator on the first pressure lock housing;

attaching a second access nipple having an exit port to the pressurized gas pipeline at a second location;

drilling a second hole in the pressurized gas pipeline through the second access nipple;

sealing off the second hole;

installing a second air lock housing on the second access nipple;

unsealing the second hole and equalizing the pressure in the second air lock housing with the pressurized gas pipeline;

moving the translating member within the pressurized gas pipeline to the second access nipple;

detaching the translating member end guide at the second location;

guiding an end of the translating member out of the pipeline and through the second hole; and moving the end of the duct rod through the exit port.

10. The method according to claim 9, wherein the end guide is detached from the translating member by a second manipulator in the second air lock housing.

11. The method according to claim 9 further including the step of installing first and second equalizing valves between the first and second drilling nipples and the first and second pressure lock housings, respectively.

12. The method according to claim 9 further comprising the step of storing the translating member end guide in the second pressure lock housing after removing the end guide from the translating member, and sealing the first and second holes with the equalizing valves.

13. The method according to claim 9 further comprising the step of deploying a first guide trough into the pipeline using a manipulator in the first pressure lock housing, after the step of equalizing the pressure in the first pressure lock housing.

14. The method according to claim 9 further comprising the steps of attaching the translating member to a cable or conduit at either exit or entry port and pulling the translating member and conduit through the pipeline.

15. The method according to claim 9 further comprising the step of applying a wet or dry lubricant to the translating member or conduit.

16. A method of installing a cable or conduit into a pressurized gas pipeline comprising the steps of:

attaching a first access fitting having a first access port at a first location on the pressurized gas pipeline;

making a first hole in the pressurized gas pipeline at the first access fitting;

attaching a second access fitting having a second access port at a second location on the pressurized gas pipeline;

making a second hole in the pressurized gas pipeline at the second access fitting;

temporarily preventing escape of gas through the first hole and the second hole;

installing a first pressure lock housing on the first access fitting;

attaching a end guide onto an end of a translating member using a manipulator located in the first pressure lock housing;

pushing the translating member and end guide through the pressurized gas pipeline, from the first access fitting to the second access fitting; and extracting the translating member from the pipeline at the second access fitting.

17. A method for installing a cable or conduit into a pressurized gas pipeline comprising the steps of:

attaching a first drilling nipple having a first entry port onto the pipeline;

temporarily sealing the entry port;

making a first hole in the pipeline through the first drilling nipple and sealing the first hole;

installing a first pressure lock housing onto the first drilling nipple;

unsealing the first hole and equalizing the pressure in the first pressure lock housing with the pipeline;

attaching a second drilling nipple having a second exit port onto the pipeline;

temporarily sealing the second exit port;

making a second hole in the pipeline through the second drilling nipple and sealing the second hole;

installing a second pressure lock housing onto the second drilling nipple;

deploying an exit guide trough into the pipeline using a manipulator in the second pressure lock housing;

feeding a translating member through the pipeline from the first hole to the second hole; and receiving the translating member on the guide trough and directing the translating member through the exit port.

18. A system for installing a cable or conduit into a pressurized pipeline comprising:

a first access nipple attachable to the pressurized pipeline and including an entry port connecting with the interior of the pipeline;

a first pressure lock housing attachable to the first access nipple;

a first manipulator moveable within the first pressure lock housing;

a second access nipple attachable to the pressurized pipeline and including an exit port connecting with the interior of the gas pipeline;

a second pressure lock housing attachable to the second access nipple;

a second manipulator moveable within the second pressure lock housing;

a translating member or conduit adapted to enter the pressurized pipeline via the entry port and to exit the pipeline via the exit port, with the translating member or conduit engageable by the second manipulator for holding or manipulating the translating member in the pipeline or for assistance in withdrawing the translating member from the pipeline; and a driver for moving the translating member or conduit through the pipeline.

19. The system of claim 18 with the first pressure housing containing at least one of: a deployable trough, a corner shield; an end guide, a completion plug, and tapered split plugs.

20. The system of claim 18 further comprising a transparent window in at least one of the first and second pressure lock housing.

21. A system for installing cable or conduit into a pressurized gas pipeline comprising:

a first drilling nipple attachable to the pressurized gas pipeline and including an entry port connectable into the interior of the gas pipeline:

a first pressure lock housing attachable to the first drilling nipple;

a second drilling nipple attachable to the pressurized gas pipeline and including an exit port connectable into the interior of the gas pipeline;

a second air lock housing attachable to the second drilling nipple and including a manipulator for engaging a cable or conduit in the pipeline and for helping to maneuver the cable or conduit towards the exit port; and a driving mechanism for moving the cable or conduit through the gas pipeline.

22. A method of installing a cable or conduit into a pressurized gas pipeline comprising the steps of:

attaching a first drilling nipple with an entry port to the pressurized gas pipeline at a first location;

making a first opening in the pipeline at the first location, within the first drilling nipple, without allowing gas to escape from the pipeline;

sealing the first opening;

installing a first air lock housing on the first drilling nipple;

unsealing the first opening and equalizing pressure between the first air lock housing and the pressurized gas pipeline;

attaching a second drilling nipple having an exit port to the pressurized gas pipeline at a second location;

sealing the exit port;

making a second opening in the pressurized gas pipeline through the second drilling nipple;

sealing the second opening;

installing a second pressure lock housing on the second drilling nipple;

unsealing the second opening and equalizing the pressure in the second pressure lock housing with the pressurized gas pipeline;

installing a transfer plug into the pipeline through the first opening;

moving the transfer plug along with differential gas pressure to the second location, with the transfer plug carrying a pull back line with it;

attaching the pull back line to a cable or conduit at the second location by using a manipulator at the second pressure lock housing; and pulling the pull back line and the cable or conduit attached to the pull back line back through the pipeline to the first location.

23. The method of claim 22 further including the steps of:

moving a first end of the pull back line into the pipeline at the first location via an inlet in the first drilling nipple;

attaching the first end of the pull back line to the transfer plug using a manipulator in the first pressure lock housing, and by viewing the manipulator through a window in the pressure lock housing;

separating the transfer plug from the pull back line at the second location using a manipulator in the second pressure lock housing;

removing the transfer plug from the pipeline using a manipulator in the second pressure lock housing;

moving the first end of the pull back line out of the pipeline via an outlet in the second drilling nipple.

24. The method of claim 16, wherein the translating member is a conduit further comprising the steps of:

attaching an end plug into the conduit;

engaging the conduit at a second access fitting on the pipeline, using a manipulator;

tilting the end plug upwardly;

engaging the end plug with a coupler; and pulling the end plug and conduit out of the second access fitting by puling on the coupler.

25. A method of installing a cable into a pressurized pipeline system comprising the steps of:

attaching a first pressure lock housing, over a first opening at a first location on the pressurized pipeline;

attaching a second pressure lock housing, over a second opening at a second location on the pressurized pipeline;

feeding a duct rod through a first seal and into the first opening;

moving the duct rod through the pipeline to the second location;

visually detecting the arrival of the duct rod at the second location;

engaging the duct rod with a manipulator and directing the duct rod toward a second seal at the second pressure lock housing;

moving the duct rod through the second seal;

attaching a cable or conduit to the duct rod; and moving the duct rod and cable or conduit back through the pipeline to the first opening.

26. A method of installing a cable into a pressurized pipeline system comprising the steps of:

attaching a first pressure lock housing, over a first opening at a first location on the pressurized pipeline;

attaching a second pressure lock housing, over a second opening at a second location on the pressurized pipeline;

feeding a translating member through a first seal and into the first opening;

moving the translating member through the pipeline to the second location;

visually detecting the arrival of the translating member at the second location;

engaging the translating member with a manipulator for directing the translating member to the second opening;

attaching a cable or conduit to the translating member at the second location; and moving the translating member with the attached cable or conduit back through the pipeline to the first opening.

27. A method of installing a cable into a pressurized pipeline system comprising the steps of:

attaching a first pressure lock housing over a first opening at a first location on the pressurized pipeline;

attaching a second pressure lock housing over a second opening at a second location on the pressurized pipeline;

feeding a duct rod through a first seal and into the first opening;

moving the duct rod through the pipeline to the second location;

attaching a cable or conduit to the duct rod using a manipulator at the second pressure lock housing; and moving the duct rod and cable or conduit back through the pipeline to the first opening.

* * * * *

UNITED STATES PATENT AND TRADEMARK OFFICE
Certificate

Patent No. 6,536,463 B1                                                                                         Patented: March 25, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Scott A. Beals, Los Angeles, CA; Robert E. Evans, Pasadena, CA; and John L. Richardson, Menlo Park, CA.

Signed and Sealed this Twelfth Day of October 2004.

*DAVE SCHERBEL*
*Supervisory Patent Examiner*
Art Unit 3753